(12) United States Patent
Mohri et al.

(10) Patent No.: US 9,494,263 B2
(45) Date of Patent: Nov. 15, 2016

(54) FLEXIBLE PIPE

(75) Inventors: Masahiro Mohri, Mie-ken (JP); Minoru Fujiyoshi, Mie-ken (JP); Fumitaka Satoh, Tokyo (JP); Tamaki Hamaguchi, Tokyo (JP); Tomoyuki Minami, Tokyo (JP)

(73) Assignee: HITACHI METALS LTD., Tokyo (JP)

(*) Notice: Subject to any disclaimer, the term of this patent is extended or adjusted under 35 U.S.C. 154(b) by 2604 days.

(21) Appl. No.: 10/597,311

(22) PCT Filed: Mar. 28, 2005

(86) PCT No.: PCT/JP2005/005781
§ 371 (c)(1),
(2), (4) Date: Jul. 20, 2006

(87) PCT Pub. No.: WO2005/093307
PCT Pub. Date: Oct. 6, 2005

(65) Prior Publication Data
US 2009/0114304 A1    May 7, 2009

(30) Foreign Application Priority Data

Mar. 26, 2004  (JP) .................................. 2004-093505
Mar. 10, 2005  (JP) .................................. 2005-068002

(51) Int. Cl.
F16L 11/00   (2006.01)
F16L 11/20   (2006.01)
F16L 11/15   (2006.01)
H02G 3/04    (2006.01)

(52) U.S. Cl.
CPC ............... *F16L 11/20* (2013.01); *F16L 11/15* (2013.01); *H02G 3/0468* (2013.01)

(58) Field of Classification Search
USPC .................. 138/121, 122, 131, 134, 139
See application file for complete search history.

(56) References Cited

U.S. PATENT DOCUMENTS

| | | | |
|---|---|---|---|
| 1,852,921 A * | 4/1932 | Dreyer ........................ 228/146 |
| 2,401,949 A * | 6/1946 | Mariner ...................... 138/131 |
| 2,449,369 A * | 9/1948 | Doane et al. ................ 138/121 |
| 2,511,896 A * | 6/1950 | Bingley ....................... 138/139 |
| 3,240,234 A * | 3/1966 | Bond, Jr. et al. ............ 138/129 |
| 3,634,606 A * | 1/1972 | Iyengar ..................... 174/106 D |
| 3,831,636 A * | 8/1974 | Bittner ........................ 138/173 |
| 4,292,463 A * | 9/1981 | Bow et al. .................... 174/107 |
| 5,043,538 A * | 8/1991 | Hughey et al. ............... 174/107 |
| 6,561,229 B2 * | 5/2003 | Wellman et al. ............. 138/146 |
| 6,732,765 B2 * | 5/2004 | Schippl et al. .............. 138/112 |
| 7,114,526 B2 * | 10/2006 | Takagi et al. ................ 138/127 |
| 7,316,548 B2 * | 1/2008 | Jager ............................ 418/48 |
| 2004/0060610 A1 * | 4/2004 | Espinasse .................... 138/134 |
| 2004/0112454 A1 * | 6/2004 | Takagi ......................... 138/139 |
| 2005/0211324 A1 * | 9/2005 | Takagi et al. ................ 138/121 |

FOREIGN PATENT DOCUMENTS

| | | |
|---|---|---|
| JP | 2002-174374 A | 6/2002 |
| JP | 2002-310381 A | 10/2002 |
| JP | 2002-315170 A | 10/2002 |
| JP | 2003-083482 A | 3/2003 |
| JP | 2003-083483 A | 3/2003 |

* cited by examiner

*Primary Examiner* — James Hook
(74) *Attorney, Agent, or Firm* — Sughrue Mion, PLLC

(57) ABSTRACT

The formation of a resin layer, a metal layer and an insulating resin layer on an outer surface of a corrugated metal pipe for flowing a fluid provides a flexible pipe, whose corrugated metal pipe does not suffer from having apertures even with spark discharge by induced lightning.

12 Claims, 6 Drawing Sheets

FLEXIBLE PIPE

FIELD OF THE INVENTION

The present invention relates to a flexible pipe for fluids such as gas, water, etc. which is installed in the walls or under the floors of buildings, etc., particularly to a flexible pipe having a safety measure to induced lightning caused by lightening, etc.

BACKGROUND OF THE INVENTION

Recently, flexible pipes are widely used in piping in buildings, etc. for fluids such as gas, water, etc. As shown in FIG. 7, a flexible pipe generally used is produced by corrugating a hoop sheet of stainless steel having a thickness of about 0.2-0.5 mm, and forming a soft vinyl chloride resin layer 4 having a thickness of about 0.5-1 mm on the outer surface of the resultant bendable corrugated metal pipe 2.

When lightening hits near a building, large current of lightening intrudes into the building through conductors such as the ground, the steel frames of the building, electric wires, etc. This phenomenon is called "induced lightning." Although the corrugated metal pipe is usually grounded or kept at potential extremely close to the ground potential, the induced lightning intruding into the building causes spark discharge, for instance, between the steel frames of the building and the corrugated metal pipe installed nearby, so that apertures of about 1 mm in diameter are likely to be formed in the corrugated metal pipe 2.

Various attempts have been proposed to provide safety measures for flexible pipes to the induced lightning. JP2002-174374A proposes a lightening-resistant pipe comprising a conductive coating layer formed on an outer surface of a flexible metal pipe, the conductive coating layer being conductively connectable to external conductive facilities. JP2003-083483A proposes a lightening-resistant pipe comprising a flexible metal pipe, and an insulating coating layer formed on the outer surface of the flexible metal pipe, the insulating coating layer being provided on its inner surface with longitudinal grooves and a conductive coating layer in contact with the flexible metal pipe, and the conductive coating layer being conductively connectable to external conductive facilities. JP2002-310381A proposes a piping comprising a metal pipe, and a self-fusible, insulating tape made of an ethylene-propylene rubber as a main material and having a thickness of 0.5-0.8 mm, which is wound around the metal pipe to prevent damage by induced lightning. JP2002-315170A proposes a piping comprising a metal pipe, and a self-fusible, insulating tape made of an ethylene-propylene rubber as a main material and wound around the metal pipe, and a grounded, shielding metal layer provided on the self-fusible, insulating tape, to prevent damage by induced lightning. JP2003-083482A proposes a lightening-resistant pipe comprising a flexible metal pipe, an insulating coating layer formed on the outer surface of the flexible metal pipe, and a wire- or strip-shaped conductive member integrally provided on the inner or outer surface of the insulating coating layer, the conductive member being conductively connectable to external conductive facilities.

It has been found, however, that the formation of a conductive coating layer on the outer surface of a corrugated metal pipe as described in JP2002-174374A, JP2003-083483A and JP2003-083482A, and the winding of a self-fusible insulating tape around the metal pipe as described in JP2002-310381A and JP2002-315170A are insufficient as safety measures to the induced lightning.

It is not easy to completely insulate the corrugated metal pipe, and attempts to secure insulation to the spark discharge make the insulating layer too thick, resulting in providing the flexible pipe with reduced flexibility, disadvantageous for piping. It also enlarges the outer diameter of the flexible pipe, thereby needing large joints to be connected.

OBJECTS OF THE INVENTION

Accordingly, an object of the present invention is to provide a flexible pipe sufficiently protecting a corrugated metal pipe from induced lightning.

Another object of the present invention is to provide a flexible pipe comprising a conductive layer near a corrugated metal pipe, the conductive layer being closer to a ground potential than the corrugated metal pipe, so that lightening current generated in the flexible pipe by spark discharge due to large potential difference in the building can escape to the ground through this conductive layer, to prevent direct discharge and damage to the corrugated metal pipe.

DISCLOSURE OF THE INVENTION

The flexible pipe according to one embodiment of the present invention comprises a resin layer and a conductive coating layer in this order from below on an outer surface of a corrugated metal pipe for flowing a fluid. Even with spark discharge occurring in the flexible pipe by induced lightning, this coating structure protects the corrugated metal pipe from having apertures, thereby preventing gas leak, etc.

Both of the resin layer and the conductive coating layer preferably covers the entire outer surface of the corrugated metal pipe. The resin layer may be a conductive layer or an insulating layer. The resin layer and the conductive coating layer are preferably formed in this order from below on the outer surface of the corrugated metal pipe. The conductive coating layer is preferably made of a metal.

The resin layer preferably covers the entire outer surface of the corrugated metal pipe, and the conductive coating layer is preferably constituted by at least one metal tape extending along the corrugated metal pipe.

The flexible pipe according to another embodiment of the present invention comprises a first resin layer, a conductive metal layer, and a second resin layer in this order from below on an outer surface of a corrugated metal pipe for flowing a fluid. Even with spark discharge occurring in the flexible pipe by induced lightning, this coating structure protects the corrugated metal pipe from having apertures, thereby preventing gas leak, etc.

The first and second resin layers may be conductive layers or insulating layers. Accordingly, the coating layer structure on the corrugated metal pipe may be (a) an insulating resin layer, a metal layer and an insulating resin layer, (b) a conductive resin layer, a metal layer and an insulating resin layer, (c) an insulating resin layer, a metal layer and a conductive resin layer, or (d) a conductive resin layer, a metal layer and a conductive resin layer, in this order from below. To completely prevent lightening current from flowing through the corrugated metal pipe, the layer structures (a) and (c) are preferable, and the layer structure (a) is particularly preferable.

The metal layer is preferably constituted by at least one metal tape extending along the corrugated metal pipe. The metal layer may be formed by a metal foil, woven or knit metal wires, a vapor-deposited, conductive layer or a metal plating, in addition to the metal tape. The conductive resin layer may be obtained by blending fine conductor particles such as metal powder, carbon black, carbon fibers, etc. with highly flexible resins such as rubbers, vinyl chloride resins, etc., but may be formed by a conductive paint containing fine conductive particles.

The flexible pipe according to a further embodiment of the present invention comprises a corrugated metal pipe for flowing a fluid, a first insulating resin layer covering the entire outer surface of the corrugated metal pipe, pluralities of metal tapes longitudinally extending on the outer surface of the first insulating resin layer, and a second insulating resin layer covering the entire outer surface of the first insulating resin layer via the metal tape, the first and second insulating resin layers being easily peelable. With this structure, (a) lightening current is completely prevented from flowing through the corrugated metal pipe, and (b) the metal tape can be easily removed by peeling the second insulating resin layer.

The first and second insulating resin layers are preferably formed by an extrusion lamination method, and not thermally fused. A parting layer may be provided between the first and second insulating resin layers.

DESCRIPTION OF THE BEST MODE OF THE INVENTION

Figure 1A:
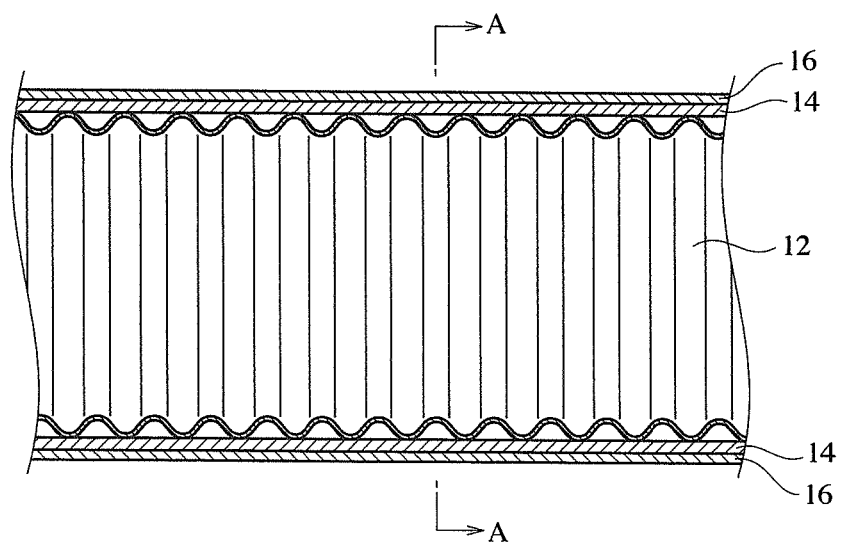
FIG. 1(a) is a cross-sectional view showing a flexible pipe according to the first embodiment of the present invention.

The flexible pipes in embodiments of the present invention will be explained in detail below referring to the attached drawings. Unless otherwise mentioned, the explanation of each embodiment is applicable to the other embodiments. Also, numerical values appearing in each embodiment are mere examples without restrictive intension. Further, to clarify features appearing in the drawings, the thickness of metal layers is exaggerated in each figure.

First Embodiment

Figure 1B:
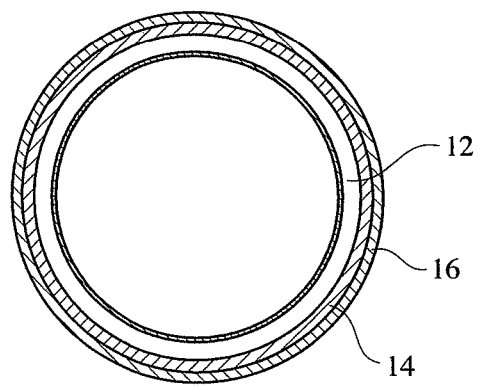
FIG. 1(b) is a cross-sectional view taken along the line A-A in FIG. 1(a).
Figure 7:
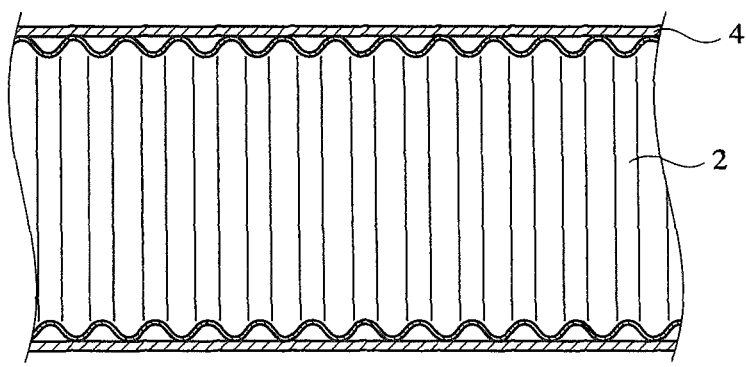
FIG. 7 is a cross-sectional view showing a conventional flexible pipe.

FIGS. 1(a) and 1(b) show a flexible pipe according to the first embodiment of the present invention. The flexible pipe in the first embodiment comprises a resin layer 14 and a conductive coating layer 16 formed in this order on the entire outer surface of a corrugated metal pipe 12 having the same structure as that of the conventional corrugated metal pipe 2 shown in FIG. 7. The resin layer 14 is preferably a high-insulation, soft vinyl chloride resin layer having a thickness of about 0.5-1 mm, but it may be a conductive resin layer. The conductive resin layer may be obtained by blending highly flexible resins such as rubbers or vinyl chloride resins, etc. with fine conductor particles such as metal powder, carbon black, carbon fibers, etc. The resin layer 14 may be formed by an extrusion lamination method.

The conductive coating layer 16 is preferably made of high-conductivity metals such as copper, aluminum, etc., but it may be formed by a conductive paint having slightly lower conductivity. The conductive paint can be applied by spraying, brushing, etc. The flexible pipe 12 and the conductive coating layer 16 are grounded.

The experiment of applying predetermined voltage to the resultant flexible pipe to cause spark discharge indicated that no apertures were formed in the flexible pipe at all despite that spark discharge occurred in the corrugated metal pipe 12, confirming that the flexible pipe had excellent induced lightning resistance.

For comparison, a flexible pipe comprising a conductive coating layer 16 and an insulating resin 14 formed in this order on the entire outer surface of the corrugated metal pipe 12, just opposite to the layer structure of the first embodiment, and a flexible pipe comprising a conductive paint layer and an insulating resin layer 14 formed in this order on the entire outer surface of the corrugated metal pipe 12 were produced, and subjected to the same experiment of induced lightning resistance. As a result, it was found that apertures having diameters of about 0.2-1.5 mm were formed in the corrugated metal pipes 12 in both flexible pipes. This verifies that to improve the induced lightning resistance, the conductive coating layer 16 should be formed over the resin layer 14. It is presumed that why apertures are formed in the corrugated metal pipe 12 in a case where the outermost layer is an insulating resin layer is due to the fact that large electric charge is stored partially in the insulating resin layer at the time of spark discharge.

Second Embodiment

Figure 2A:
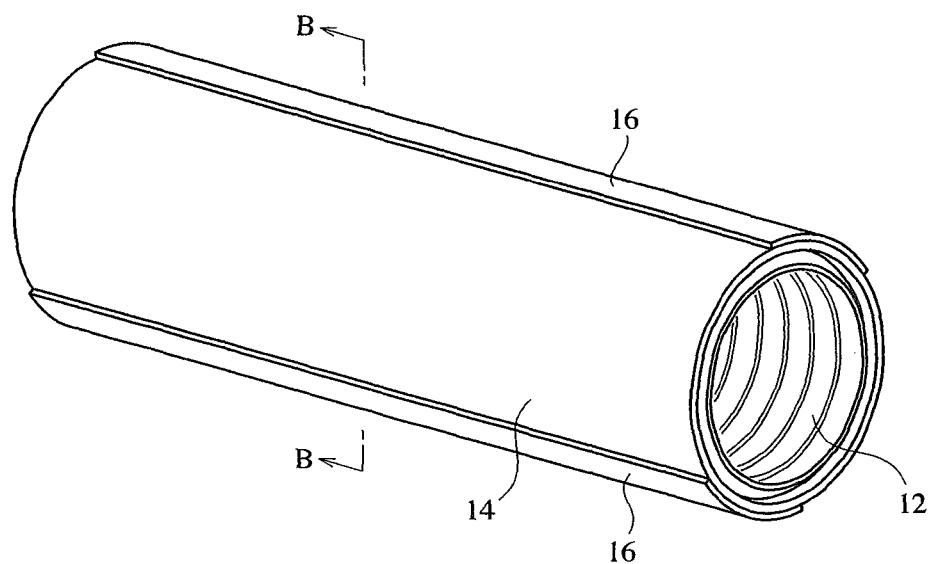
FIG. 2(a) is a perspective view showing one example of flexible pipes according to the second embodiment of the present invention.
Figure 2B:
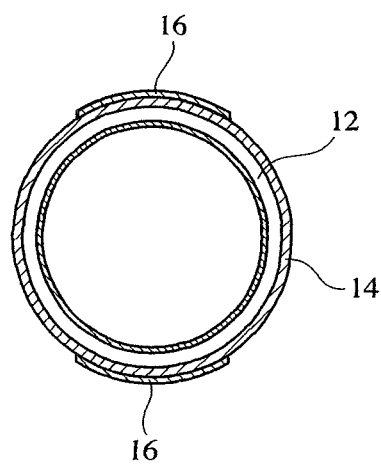
FIG. 2(b) is a cross-sectional view taken along the line B-B in FIG. 2(a).
Figure 3A:
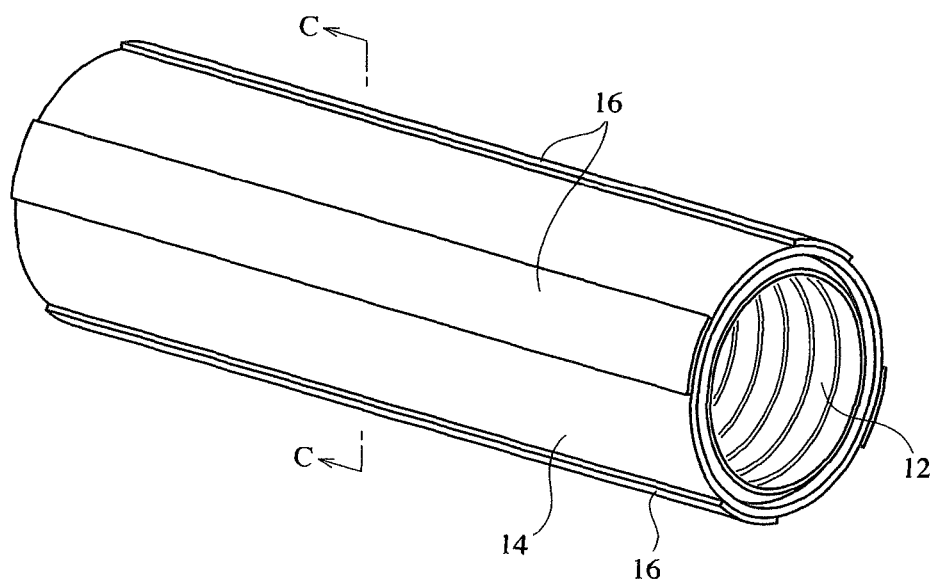
FIG. 3(a) is a perspective view showing another example of flexible pipes according to the second embodiment of the present invention.
Figure 3B:
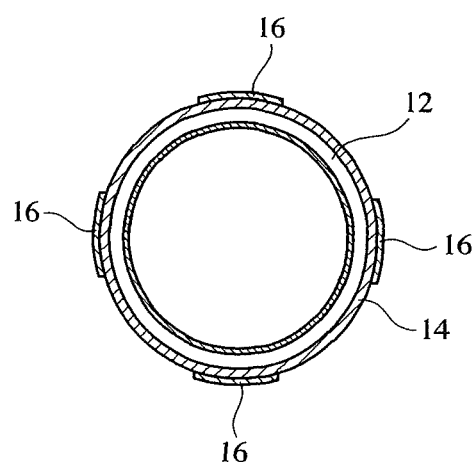
FIG. 3(b) is a cross-sectional view taken along the line C-C in FIG. 3(a).

The outermost conductive coating layer 16 need not cover the entire outer surface of the corrugated metal pipe 12, but may be partially formed on the resin layer 14. In examples shown in FIGS. 2 and 3, the conductive coating layer 16 is constituted by pluralities of longitudinally extending conductive tapes, which partially cover the resin layer 14 formed on the entire outer surface. The conductive coating layer 16 is constituted by two conductive tapes disposed at a circumferential interval of 180° in the example shown in FIG. 2, and by four conductive tapes disposed at a circumferential interval of 90° in the example shown in FIG. 3. The conductive tape is preferably a metal tape of about 10 mm in width and about 0.02-0.1 mm in thickness, such as a metal foil tape of copper, etc., for instance, when the corrugated metal pipe 12 has a diameter of about 15-28 mm.

The use of pluralities of metal tapes is to provide the flexible pipe with improved reliability in induced lightning resistance, taking into consideration the likelihood that one metal tape is burned out by one lightening, although one metal tape can exhibit enough induced lightning resistance as long as it meets the conditions of current resistance and resistivity. The arrangement of pluralities of metal tapes makes it easy for discharge to occur between the metal tapes with narrow gaps, surely providing lightening current path.

In an arbitrarily bendable flexible pipe, metal tapes tend to be broken on the outside surfaces of its bent portions, but they permit electric current to flow not only through the broken portions but also between adjacent ones by discharge, so that lightening current can surely escape to the ground.

The flexible pipe in the second embodiment may be the same as the flexible pipe in the first embodiment except for the conductive coating layer 16. Accordingly, the resin layer 14 may be a conductive resin layer.

The same experiment of induced lightning resistance as in the first embodiment was conducted on the flexible pipe in the second embodiment, revealing that no apertures were formed at all in the corrugated metal pipe 12.

Third Embodiment

Figure 4A:
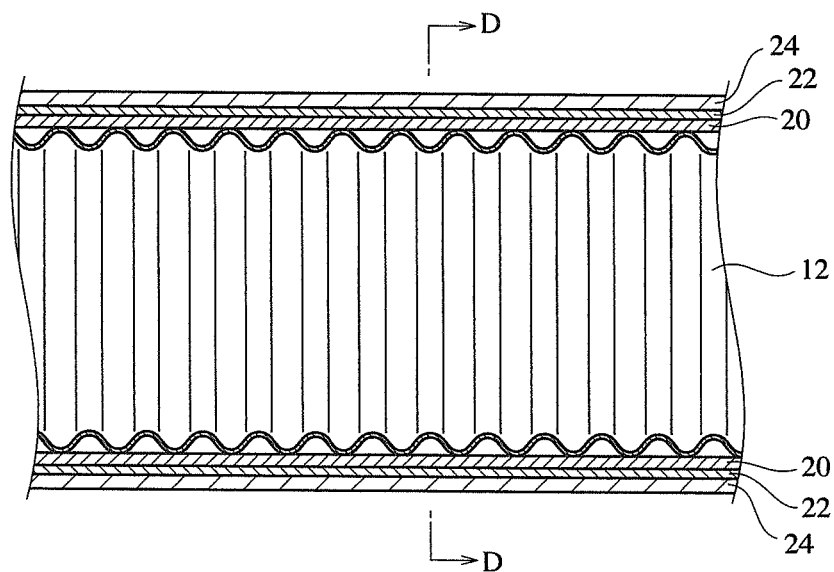
FIG. 4(a) is a cross-sectional view showing a flexible pipe according to the third embodiment of the present invention.
Figure 4B:
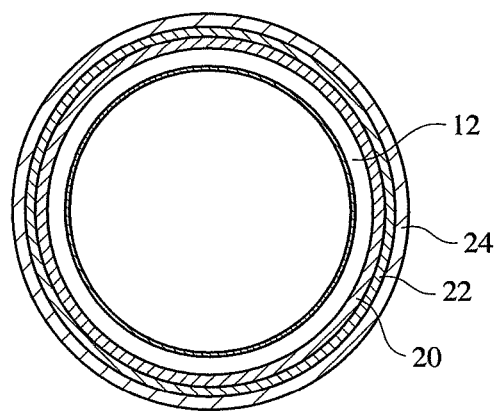
FIG. 4(b) is a cross-sectional view taken along the line D-D in FIG. 4(a).
Figure 5:
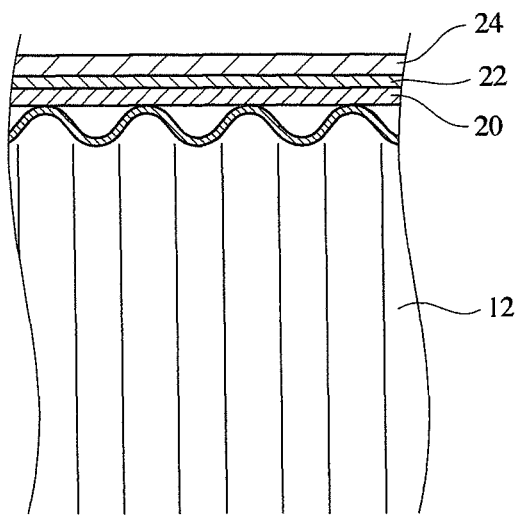
FIG. 5 is an enlarged view of part of FIG. 4(a).
Figure 6:
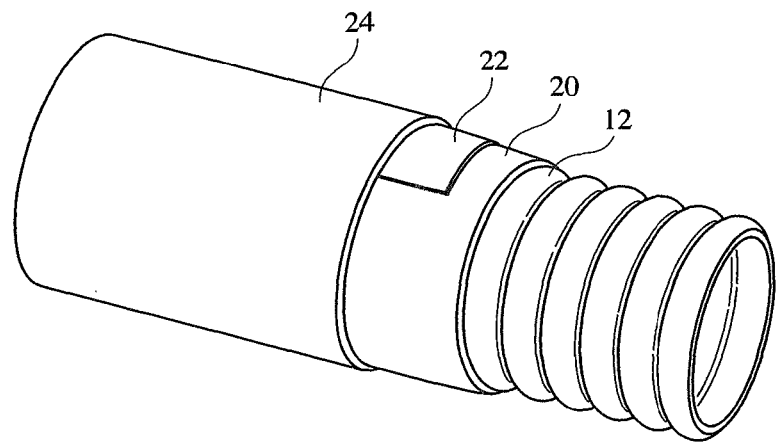
FIG. 6 is a partially broken perspective view showing the flexible pipe of FIG. 4.

FIGS. 4-6 show a flexible pipe according to the third embodiment of the present invention. This flexible pipe has a three-layer coating comprising a first resin layer 20, a conductive metal layer 22 and a second resin layer 24 on the entire outer surface of a corrugated metal pipe 12. The first and second resin layers 20, 24 may be conductive or insulating. The second resin layer 24 protects the metal layer 22 from corrosion, thereby preventing the metal layer 22 from peeling by an external force (for instance, bending force) during installation. The conductive resin layer may be the same as described above. The insulating resin layer may be a high-insulation, soft vinyl chloride layer having a thickness of about 0.5-1 mm like as in the first embodiment. The metal layer 22 is grounded. Both first and second resin layers 20, 24 may be formed by an extrusion lamination method.

Accordingly, the coating layer may have a structure of (a) an insulating resin layer, a metal layer and an insulating resin layer, (b) a conductive resin layer, a metal layer and an insulating resin layer, (c) an insulating resin layer, a metal layer and a conductive resin layer, or (d) a conductive resin layer, a metal layer and a conductive resin layer, in this order from below. Because the conductive resin layer has much higher electric resistance than that of the metal layer, the induced lightning resistance is not affected by whether or not the innermost layer is a conductive resin layer or an insulating resin layer. However, to surely prevent lightening current from flowing through the corrugated metal pipe, the layer structures (a) and (c) are preferable, and the layer structure (a) is most preferable.

The metal layer 22 is preferably formed by a high-conductive metal foil of aluminum, copper, etc. A tape-shaped metal foil preferably extends in a longitudinal direction on or wound by at least one turn around the outer surface of the first resin layer 20. Alternatively, a metal tape with an adhesive on the rear surface may be attached to the outer surface of the first resin layer 20, but it had better not be bonded to the outer surface of the first resin layer 20 such that it can be easily peeled at the time of recycling.

Like in the second embodiment, the metal layer 22 need not be formed on the entire outer surface of the corrugated metal pipe 12, and it may be formed by pluralities of tape-shaped metal foils (metal tapes) as long as they meet the conditions of current resistance and resistivity. Because lightening current flows to the ground through the metal layer 22 when hit by lightening, the larger thickness and width the metal foil has, the higher lightening current resistance it has. The experiment of causing spark discharge in a flexible pipe provided with one copper foil of 35 μm in thickness and 5 mm in width as the metal layer 22 confirmed that it withstood at least one impulse current of 8/20 μS having a peak current value of 30 kA.

When the metal layer 22 is made of copper, aluminum, etc., it may be broken when the flexible pipe is bent, because of no extendibility. However, because the flexible pipe has an insulating resin layer 24 as an outermost protective layer, the peeling of the metal layer 22 is prevented. Unless the metal layer 22 peels completely, its lightning resistance is not lost to such high current as to cause damage to the flexible pipe, even though it is broken to some extent, because discharge easily takes place in gaps in the broken portions of the metal layer 22. Even with gaps of 10-30 mm longitudinally at 1-meter intervals in metal foils, the metal foils' induced lightning resistance was not reduced.

What is necessary to form this three-layer coating is only to form the first resin layer 20 on the outer surface of the corrugated metal pipe 12, attach the metal layer 22 constituted, for instance, by tape-shaped metal foils, and then form the second resin layer 24 thereon. The metal layer 22 sandwiched by the first resin layer 20 and the second resin layer 24 is preferably easily peelable from any layer, to make recycling easy. For this purpose, it is preferable to form a parting layer on the metal layer 22 in advance.

As a result of conducting the same experiment of induced lightning resistance as in the first embodiment on the flexible pipe in the third embodiment, no apertures were formed at all in the corrugated metal pipe 12.

Specifically, the flexible pipe in the third embodiment comprises a corrugated metal pipe 12 for flowing a fluid, a first insulating resin layer 20 covering the entire outer surface of the corrugated metal pipe 12, pluralities of metal tapes 22 longitudinally extending on the outer surface of the first insulating resin layer 20, and a second insulating resin layer 24 covering the entire outer surface of the first insulating resin layer 20 via the metal tape 22, the first and second insulating resin layers 20, 24 being easily peelable.

As described above, when the first and second insulating resin layers 20, 24 are formed by an extrusion lamination method, both layers 20, 24 are likely to be thermally fused if they are made of the same resin. If the first and second insulating resin layers 20, 24 were thermally fused, it would be difficult to remove the metal tape 22 at the time of recycling. Accordingly, lest that the first and second insulating resin layers 20, 24 are thermally fused, a parting layer is preferably provided between both layers. The parting layer is preferably made of a silicone resin, etc.

To make the removal of the metal tape 22 easy at the time of recycling, the metal tape 22 are preferably coated with a parting layer as described above. When the second resin layer 24 is extrusion-laminated to the metal tape 22 coated with a parting layer, which are laid on the first resin layer 20 coated with a parting layer, the second resin layer 24 is neither thermally fused to the first resin layer 20 nor to the metal tape 22. Accordingly, the metal tape 22 can be easily removed by cutting the second resin layer 24 by a cutter, etc.

In all embodiments, the metal layer should have lower electric resistance per unit length than that of the corrugated metal pipe, such that electric current flows predominantly in the metal layer than in the corrugated metal pipe. The metal layer may be in the form of a tape or tube formed by woven or knit conductive metal wires, a vapor-deposited, conductive layer or a metal plating, in addition to the metal foil.

EFFECT OF THE INVENTION

Because the flexible pipe of the present invention comprises a resin layer and a metal layer on an outer surface of a corrugated metal pipe, no apertures are formed in the corrugated metal pipe even with spark discharge occurring in the flexible pipe by induced lightning, thereby preventing gas leak, etc. Also, because it can be provided with improved spark discharge resistance (induced lightning resistance) without increasing the thickness of the resin layer, the flexible pipe does not suffer increase in an outer diameter and decrease in flexibility.

With a coating layer structure on the outer surface of the corrugated metal pipe comprising a first insulating resin layer, pluralities of metal tapes and a second insulating resin layer, (a) lightening current is completely prevented from flowing through the corrugated metal pipe, and (b) the metal tapes can be easily removed by peeling the second insulating resin layer, thereby making recycling easy.

What is claimed is:

1. A flexible pipe comprising a first resin layer, a conductive metal layer and a second resin layer in this order from below on an outer surface of a corrugated metal pipe for flowing a fluid, wherein said metal layer is constituted by at least one metal tape extending substantially parallel to the longitudinal axis of said corrugated metal pipe, and wherein said first resin layer and said second resin layer are laminated partly in contact with each other.

2. The flexible pipe according to claim 1, wherein said conductive coating layer is made of a metal.

3. The flexible pipe according to claim 1, wherein both of said resin layer and said conductive coating layer cover the entire outer surface of said corrugated metal pipe.

4. The flexible pipe according to claim 1, wherein said first and second resin layers are conductive layers or insulating layers.

5. The flexible pipe according to claim 4, wherein said conductive resin layer is formed by a conductive paint.

6. The flexible pipe according to claim 1, wherein said metal layer is formed by a metal foil, woven or knit metal wires, a vapor-deposited, conductive layer, or a metal plating.

7. The flexible pipe according to claim 1, wherein said metal tape longitudinally has gaps in broken portions.

8. The flexible pipe according to claim 7, wherein a thickness of said metal tape is 0.02-0.1 mm.

9. The flexible pipe according to claim 1, wherein said first resin layer and said second resin layer are not peelable.

10. A flexible pipe comprising a corrugated metal pipe for flowing a fluid, a first insulating resin layer covering the entire outer surface of said corrugated metal pipe, at least one metal tape extending substantially parallel to the longitudinal axis of said corrugated metal pipe on the outer surface of said first insulating resin layer, and a second insulating resin layer covering the entire outer surface of said first insulating resin layer via said metal tape, said first and second insulating resin layers being laminated partly in contact with each other but easily peelable.

11. The flexible pipe according to claim 10, wherein said first and second insulating resin layers are formed by an extrusion lamination method, and not thermally fused.

12. The flexible pipe according to claim 10, comprising a parting layer between said first and second insulating resin layers.

* * * * *